United States Patent
Maeno et al.

(10) Patent No.: US 7,738,205 B2
(45) Date of Patent: Jun. 15, 2010

(54) RECORDING DISK DRIVE AND METHOD OF MANAGING DEFECTIVE REGIONS IN THE SAME

(75) Inventors: Tomoharu Maeno, Kanagawa (JP); Toshiaki Satoh, Kanagawa (JP); Masahiro Shimizu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 501 days.

(21) Appl. No.: 11/655,819

(22) Filed: Jan. 18, 2007

(65) Prior Publication Data

US 2007/0188905 A1    Aug. 16, 2007

(30) Foreign Application Priority Data

Jan. 18, 2006    (JP)    ............... 2006-009835

(51) Int. Cl.
G11B 5/09    (2006.01)
(52) U.S. Cl. .............. 360/53; 360/48; 360/77.02
(58) Field of Classification Search .............. None
See application file for complete search history.

(56) References Cited

U.S. PATENT DOCUMENTS

| | | | | |
|---|---|---|---|---|
| 4,774,700 | A * | 9/1988 | Satoh et al. | 369/47.14 |
| 5,271,018 | A * | 12/1993 | Chan | 714/710 |
| 5,442,499 | A * | 8/1995 | Emori | 360/77.08 |
| 5,541,903 | A * | 7/1996 | Funahashi et al. | 369/53.16 |
| 6,034,831 | A * | 3/2000 | Dobbek et al. | 360/53 |
| 6,052,250 | A * | 4/2000 | Golowka et al. | 360/77.08 |
| 6,201,655 | B1 * | 3/2001 | Watanabe et al. | 360/53 |
| 6,295,176 | B1 * | 9/2001 | Reddy et al. | 360/48 |
| 6,850,379 | B2 * | 2/2005 | Andoh et al. | 360/53 |
| 6,937,408 | B2 | 8/2005 | Hattori et al. | |
| 7,342,741 | B1 * | 3/2008 | Emo et al. | 360/78.07 |
| 7,369,343 | B1 * | 5/2008 | Yeo et al. | 360/60 |
| 2002/0133485 | A1 * | 9/2002 | Furuhashi | 707/3 |
| 2003/0126527 | A1 * | 7/2003 | Kim et al. | 714/719 |
| 2004/0028393 | A1 * | 2/2004 | Katata | 386/113 |
| 2004/0075933 | A1 * | 4/2004 | Hetzler et al. | 360/75 |
| 2005/0226115 | A1 * | 10/2005 | Okazaki et al. | 369/47.34 |
| 2007/0053093 | A1 * | 3/2007 | Allen et al. | 360/48 |

FOREIGN PATENT DOCUMENTS

| | | |
|---|---|---|
| JP | 07-326032 | 12/1995 |
| JP | 09-091905 | 4/1997 |
| JP | 2002-260355 | 9/2002 |

* cited by examiner

Primary Examiner—Dismery E Mercedes
(74) Attorney, Agent, or Firm—Townsend and Townsend and Crew LLP; Patrick Duncan

(57) ABSTRACT

Embodiments in accordance with the present invention relate to identifying an address of user data to be registered as a defective user data address in disk defect inspection. In an embodiment of the present invention, in the state where a write element is positioned to a target position to execute data write processing to execute normal data read processing, a write element executes data write processing. If a predefined error occurs during the data write processing, an address of user data for which the normal data write processing is executed is estimated using the error-causing servo data as a target. In addition, an address of the servo data used as the target during the normal data write processing for the estimated address of the user data is identified. If the identified address of the servo data and the address of the error-causing servo data match with each other, the estimated address of the user data is registered as a defective user data address.

11 Claims, 9 Drawing Sheets

RECORDING DISK DRIVE AND METHOD OF MANAGING DEFECTIVE REGIONS IN THE SAME

CROSS-REFERENCES TO RELATED APPLICATIONS

The instant nonprovisional patent application claims priority to Japanese Patent Application 2006-009835, filed Jan. 18, 2006 and incorporated by reference herein for all purposes.

BACKGROUND OF THE INVENTION

Embodiments in accordance with the present invention relate to recording disk drives and to methods of managing defective regions in the same. More particularly, embodiments in accordance with the present invention relate to managing defective regions in a recording disk drive which has a head whose read/write offsets are present.

Devices using various types of media such as optical disks, and magnetic tapes, are known in the art as data storage devices. Among them, hard disk drives (hereinafter referred to as HDD) have become popular as storage devices for computers to such an extent that they are one of the storage devices indispensable for today's computer systems. Further, the HDDs are not limited to use for the computer systems as described above, they are being used in many fields because of excellent characteristics. For example, The HDDs are used for moving picture recording/reproducing devices, car navigation systems, cellular phones, and removable memories for use in digital cameras.

The HDD that writes and reads data using a head element section performs positioning control of a head, based on servo data formed on a magnetic disk. The tracks formed concentrically on the magnetic disk each include a plurality of servo sectors, each of which further consists of servo data and user data. During manufacturing processes of the HDD, servo data is recorded on the magnetic disk by means of a servo-writer or the like.

In recent years, with the tendency to increase the storage capacity and recording density of the HDD, the data track pitches, servo track pitches, and data sector pitches tend to be narrowed. This has been reducing a tolerance for fluctuation of a head element section. The non-uniformity of servo track pitches is produced due to structural non-uniformity of HDDs and the non-uniformity of head positions during servo-writing. The non-uniformity of servo track pitches cannot be ignored while narrowing track pitches or sector pitches.

For example, the non-uniformity of servo track pitches causes the servo tracks to be regionally narrowed. A servo track that is regionally narrowed causes a "squeeze error" in which writing is performed on a track next to a desired track and thus data on the next track is erased. The "squeeze" is an event in which the head element section overwrites a track next to a desired track since a servo track cannot be properly read by a head element section or since a servo track is regionally narrowed or for some other reasons.

Tests for detecting defects on the surfaces of magnetic disks are therefore performed during the manufacturing processes of HDDs. These tests, called SRSTs (Self-Run Self-Tests), are described in Japanese Patent Laid-open No. 2002-260355 (Patent Document 1), for example. In the SRSTs, in addition to SATs (Surface Analysis Tests) for detecting defective regions in which a scratch or the like is formed by performing data read/write operations from/to a magnetic disk, tests called FILL-DATA tests are performed. Defective sectors that have been detected during the tests are registered on a map called PDM (Primary Defect Map). The data sectors that have been registered on PDM are not used.

During the FILL-DATA tests, data is written into all data regions of the magnetic disk and the data tracks on which a write error occurs are detected. All data sectors included in these data tracks are registered on the PDM as defective regions. The FILL-DATA tests are performed to defect the defective regions in which a write error frequently occurs caused by a servo track error such as a servo track narrowed, an unreadable servo track.

BRIEF SUMMARY OF THE INVENTION

Embodiments in accordance with the present invention relate to identifying an address of user data to be registered as a defective user data address in disk defect inspection. In an embodiment of the present invention, in the state where a write element is positioned to a target position to execute data write processing to execute normal data read processing, a write element executes data write processing. If a predefined error occurs during the data write processing, an address of user data for which the normal data write processing is executed is estimated using the error-causing servo data as a target. In addition, an address of the servo data used as the target during the normal data write processing for the estimated address of the user data is identified. If the identified address of the servo data and the address of the error-causing servo data match with each other, the estimated address of the user data is registered as a defective user data address.

For a more complete understanding of the present invention, reference is made to the following detailed description taken in conjunction with the accompanying drawings.

Figure 1:
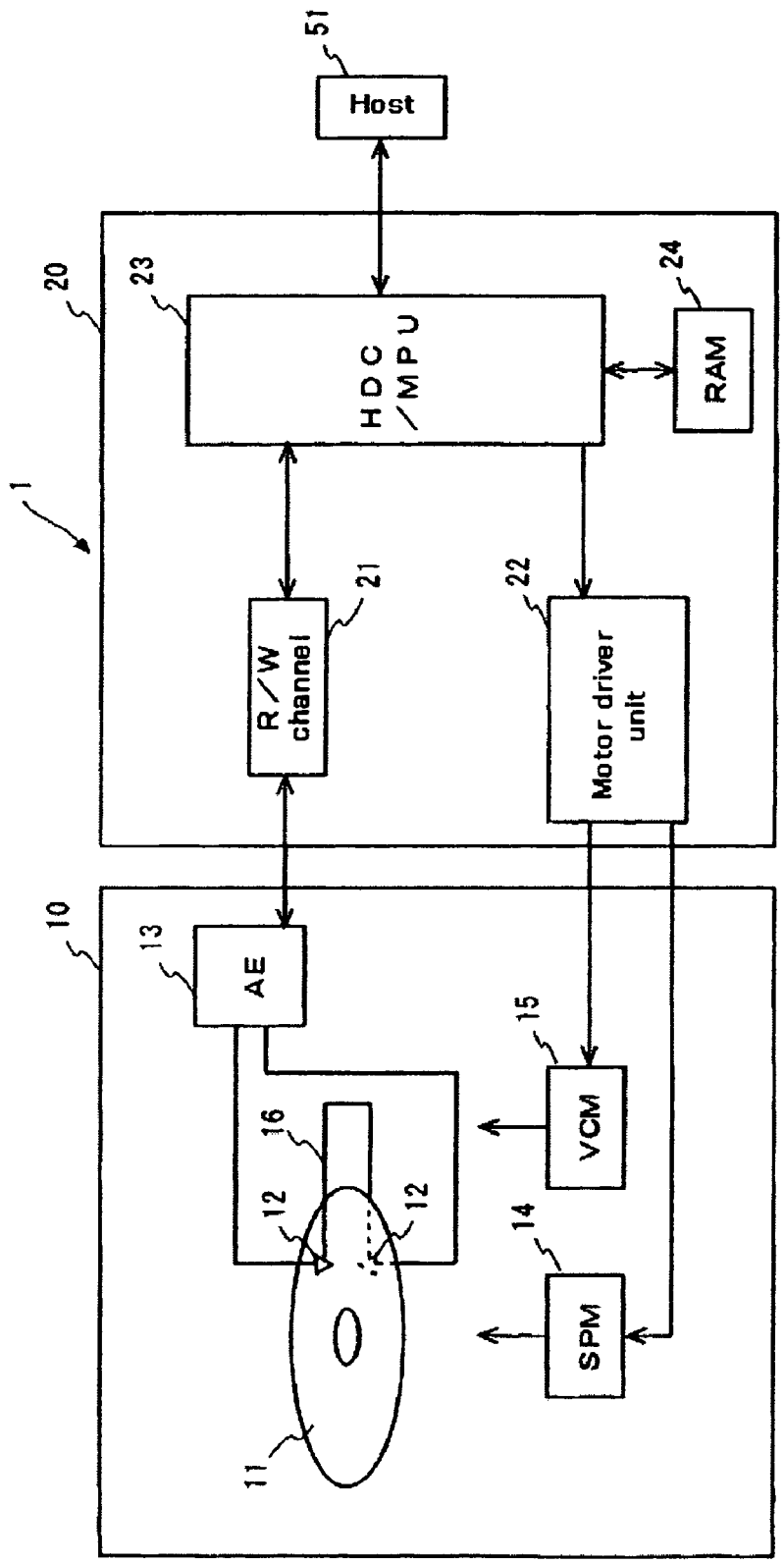
FIG. 1 is a block diagram showing schematically an entire configuration of an HDD 1 according to an embodiment of the present invention.

6 write data using an error servo track is identified if a write error is detected during "FILL-DATA at read position".

DETAILED DESCRIPTION OF THE INVENTION

Embodiments in accordance with the present invention relate to identifying an address of user data to be registered as a defective user data address in disk defect inspection. In an embodiment of the present invention, in the state where a write element is positioned to a target position to execute data write processing to execute normal data read processing, a write element executes data write processing. If a predefined error occurs during the data write processing, an address of user data for which the normal data write processing is executed is estimated using the error-causing servo data as a target. In addition, an address of the servo data used as the target during the normal data write processing for the estimated address of the user data is identified.

During the FILL-DATA tests, processing called "FILL-DATA at write position" and processing called "FILL-DATA at read position" is performed. In "FILL-DATA at write position", the head element section (read element) is positioned at a write position for writing data onto a data track, and data write processing is executed. If a write error occurs on a data track, the data track at which the write element is positioned (or is writing data) is determined as a defective region, and all data sectors in the data track are registered on the PDM.

In "FILL-DATA at read position", the head element section (read element) is positioned at a read position for reading out data from a data track, and data write processing is executed. If a write error occurs on a data track, the data track at which the read element is positioned is determined as a defective region, and all sectors in the data track are registered on the PDM.

If a write error is detected during "FILL-DATA at read position", a defect is considered to be present on the servo track at which the read element reads data. With respect to reliability for the HDD, it is desirable that the data tracks onto which data is written using the servo track should be registered as defective regions on the PDM in addition to the data tracks from which data is read out using the particular servo track. The same also applies to data tracks from which data is read out using an error servo track detected during "FILL-DATA at write position".

For these reasons, a technique is required that identifies data tracks onto which data is written using an error servo track detected during "FILL-DATA at read position", or a technique is required that identifies data tracks from which data is read using an error servo track detected during "FILL-DATA at write position". Identifying these data tracks is particularly difficult in the HDDs having a magnetic disk whose data track pitch and servo track pitch differ from each other, so a more efficient identification method is desired.

An aspect of an embodiment of the present invention is a method of managing defective regions in a recording disk drive which includes a head having a read element and a write element different in position from each other in the radial direction of a recording disk, and which positions the head while reading out recorded servo data from the recording disk by using the read element. The management method includes the steps of: executing data write processing while the read element is positioned at a target position to perform either normal data read access or normal data write access; if a predefined error occurs during the data write processing, estimating an address of user data for which the other normal data read access or normal data write access is performed using the error-causing servo data as a target; for the other access to the estimated address of the user data, identifying an address of the servo data used as the target; comparing the identified address of the servo data and the address of the error-causing servo data; and in accordance with comparison results, registering a region identified by the estimated address of the user data, as a defective region.

Identifying an address of an associated servo data from the estimated address of the user data makes it possible to identify the user data address to be registered as a defective user data address, by using a technique usually applied to the recording disk drive.

In some embodiments, the address of the user data identifies a data track, the address of the error-causing servo data and the identified address of the servo data identify respective servo tracks, and all regions in the data track which the address of the user data identifies are registered as defective regions. Thus, if a servo error exists, writing data onto a track different from the target can be prevented more reliably by using the technique described above.

In some embodiments, the address of the servo data is identified from the estimated address of the user data through computation without a head seek operation. The address of the servo data can thus be rapidly identified. Also, computation of the servo data address may employ a calculation function used during the normal data read and write access operations. This is not required to implement a new calculation function to identify servo data addresses.

If the data track pitch and servo track pitch recorded on the recording disk differ from each other, the present invention is particularly useful since conversion processing between servo data addresses and user data addresses becomes complicated.

Estimating the user data address and identifying the servo data address are repeated until the identified address of the servo data and the address of the error-causing servo track are matched with each other. The region identified by the user data address at which the match has been obtained is registered as a defective region. In addition, if the identified address of the servo data and the address of the error-causing servo track are not matched, the identified address of the servo data is preferably used as a basis for estimating an address of next user data such that the servo data used as a target will be close to the error-causing servo data track. This allows an address of the intended user data to be rapidly identified.

A recording disk drive according to another embodiment of the present invention includes a head which has a read element and a write element different in position from each other in the radial direction of a recording disk, a memory for storing defective regions of the recording disk, and a controller. If a predefined error occurs during data write processing when the read element is positioned at a target position for performing either normal data read access or normal data write access, the controller estimates an address of user data to which the other normal data read or normal data write access is performed using the error-causing servo data as a target, and identifies an address of the servo data used as the target for the other access to the estimated address of the user data. In addition, the controller, in accordance with results of comparison between the identified address of the servo data and the address of the error-causing servo data, stores into the memory a region identified by the estimated address of the user data.

The address of the servo data is preferably identified from the estimated address of the user data through computation without a head seek operation. Alternatively, for computation to identify the servo data address, a calculation function used during the normal data read and write access operations is desirable.

According to an embodiment of the present invention, a user data address to be registered as a defective user data address can be identified during defect inspection of a recording disk.

Embodiments of the present invention will be described hereunder. In the description below and the accompanying drawings, some parts are omitted and simplified as appropriate for clarity of the description. Also, the same reference number is assigned to the same constituent element in each drawing, and duplicated description is omitted as necessary for descriptive clarity.

Hereinafter, embodiments of the present invention will be described taking a hard-disk drive (HDD) as an example of a data storage device. Writing tests at a normal write position and writing tests at a read position are performed during magnetic disk defect detection and inspection according to the embodiments of the present invention. For example, if an error occurs during the writing tests at the read position, data regions in which data is to be written using the same servo data are registered as defective regions. One major feature of embodiments in accordance with the present invention relates to a technique for identifying a data region using the same servo data.

To make it easy to understand the abovementioned features of embodiments of the present invention, the entire configuration of the HDD is outlined below. FIG. 1 is a block diagram showing schematically the configuration of the HDD 1. As shown in FIG. 1, the HDD 1 includes a hermetically sealed enclosure 10. The hermetically sealed enclosure 10 includes a magnetic disk 11 that is an example of a recording disk, a head element section 12 that is an example of a head, arm electronics (AE) 13, a spindle motor (SPM) 14, a voice coil motor (VCM) 15, and an actuator 16 therein.

The HDD 1 also has a circuit board 20 fixed to the outside of the enclosure 10. A read/write channel (R/W channel) 21, a motor driver unit 22, an integrated circuit 23 including a hard-disk controller (HDC) and a microprocessing unit (MPU) in combination (hereinafter, the HDC/MPU 23), a RAM 24, and other ICs are arranged on the circuit board 20. Constituent elements of each circuit may be integrated into one IC or separately mounted in a plurality of ICs.

User data transmitted from an external host 51 is received by the HDC/MPU 23 and then written onto the magnetic disk 11 via the R/W channel 21 and the AE 13 by the head element section 12. Also, user data that has thus been stored onto the magnetic disk 11 is read out by the head element section 12, and the user data is output from the HDC/MPU 23 to the external host 51 via the AE 13 and the R/W channel 21.

The magnetic disk 11 is secured to the SPM 14. The SPM 14 causes the magnetic disk 11 to rotate at a required angular velocity. The motor driver unit 22 drives the SPM 14 in accordance with control data from the HDC/MPU 23. Each head element section 12 is fixed to a slider (not shown). The slider is fixed to a front end of the actuator 16. The actuator 16 is coupled directly to the VCM 15, and pivots about a rotating shaft to move the head element section 12 (and the slider) in the radial direction of the rotating magnetic disk 11, along the surface of the disk. The motor driver unit 22 drives the VCM 15 in accordance with the control data (in this Specification, called DACOUT) from the HDC/MPU 23.

The head element section 12 has a write element that converts an electrical signal into a magnetic field according to data recorded on the magnetic disk 11, and a read element that converts a magnetic field arising from the magnetic disk 11 into an electrical signal. When the head element section 12 is positioned above the magnetic disk 11, the write element and the read element are present different in position from each other in the radial direction of the magnetic disk 11. This difference in radial position (i.e., distance) between the write element and the read element is called a read/write offset. The number of magnetic disks 11 may be one or more, and a recording surface may be formed on one side or both sides of the magnetic disk 11.

The AE 13 selects, from a plurality of head element sections 12, one head element section 12 to access the magnetic disk 11, then amplifies, at a constant gain level, a read signal read out by the selected head element section 12, and sends the read signal to the R/W channel 21. Also, a write signal from the R/W channel 21 is transmitted to the selected head element section 12. During read processing, the R/W channel 21 that has received the read signal supplied from the AE 13 amplifies the read signal so as to obtain a constant amplitude, then extracts data from the obtained read signal, and decodes the data. Data that is read out after being decoded includes user data and servo data. The decoded user data and servo data are supplied to the HDC/MPU 23. In addition, during write processing, the R/W channel 21 performs code modulation on write data which has been supplied from the HDC/MPU 23, then further converts the code-modulated write data into a write signal, and supplies the write signal to the AE 13.

For the HDC/MPU 23, the MPU operates based on codes that have been loaded into the RAM 24. When the HDD 1 starts operating, the data required for control and for data processing, in addition to the codes that operates on the MPU, is loaded from the magnetic disk 11 or a ROM (not shown). The HDC/MPU 23 executes necessary processing related to data processing such as read/write processing control, command execution order management, servo signal-based positioning control (servo control) of the head element section 12, interface control, and defect management. The HDC/MPU 23 also executes total control of the HDD 1. In some embodiments of the present invention, the HDC/MPU 23 performs defect tests for a magnetic disk during manufacturing processes of the HDD 1. The defect tests will be described later.

Figure 2:
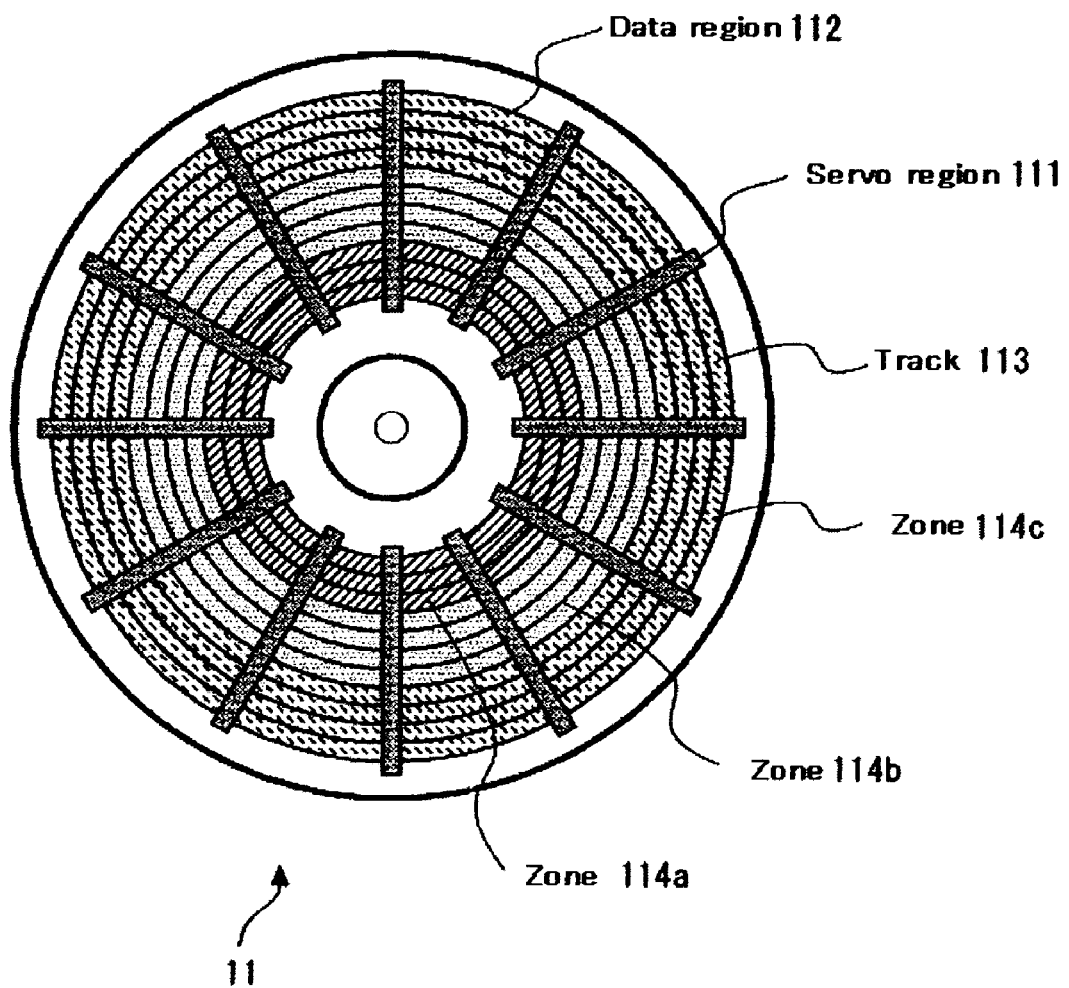
FIG. 2 is a diagram schematically showing the state of the data recorded on a recording surface of a magnetic disk.

The data recorded on the magnetic disk 11 is described below with reference to FIG. 2. FIG. 2 schematically shows data recorded on a recording surface of the magnetic disk 11. As shown in FIG. 2, the recording surface of the magnetic disk 11 has a plurality of servo regions 111 and a plurality of data regions 112. The plurality of servo regions 111 extend radially from the center of the disk 11 in the radial direction thereof and are partitioned at required angle intervals, while each of the plurality of data regions 112 is sandwiched between two servo regions 111 next thereto. Servo data to perform positioning control of the head element section 12 is recorded in each servo region 111. User data is recorded in each data region 112.

A plurality of data tracks 113 each having a required width in the radial direction of the magnetic disk 11 are formed concentrically on the recording resurface. User data is recorded along the data tracks 113. Each data track 113 has a plurality of data sectors (a recording unit of the user data) between two servo regions 111.

The plurality of data tracks 113 are each grouped into a plurality of zones 114 according to a particular radial position on the magnetic disk 11. The number of data sectors included in one track 113 is set to be equal to the number of zones. Three zones 114a to 114c are shown as an example in FIG. 2.

Similarly, the magnetic disk 11 has a plurality of servo tracks each having a required width in the radial direction of the magnetic disk 11 and formed concentrically thereon. Each servo track is constituted by plural sets of servo data separated by the data regions 112. In some embodiments of the present invention, the servo tracks and the data tracks do not match with each other with respect to the pitch. This will be described later herein.

Each set of servo data has a servo track number, a servo sector number in the servo track, and burst patterns for accurate control of position. The burst patterns are constituted by, for example, four burst patterns, A, B, C, and D, different from one another in radial position. Positions in the servo track can be determined by particular amplitude of a read signal of each burst pattern. The positions in the servo track are expressed by PES (Position Error Signal) data, which is divided into 256 values in the radial direction of the magnetic disk 11. In this Specification, the position expressed by the servo track number, the servo sector number, and the PES data, is defined as a servo address.

The HDD 1 of the present embodiment executes SRST (Self-Run Self-Test) during the manufacturing processes of the HDD. During SRST, the HDD 1 executes an installed test program to perform defect detection tests on the magnetic disk 11 autonomously. In addition to SAT (Surface Analysis Test) for detecting detects on the surface of the magnetic disk 11 by writing data thereto and reading data therefrom, the HDD 1 executes a FILL-DATA test by executing only data write processing to detect regions causing a write error. Any defective data sectors that have been detected during SRST are registered on PDM (Primary Defect Map). Under normal operating conditions, the HDD 1 does not use data sectors registered on the PDM and skips the registered data sectors.

In the FILL-DATA test, the data write processing is executed in all data regions of the magnetic disk 11 and data tracks on which a write error occurs are detected. All data sectors included in each such data track are registered as defective regions on the PDM. The write processing here means a series of processing steps from a seek operation (moving the head to a target) to data write onto the magnetic disk 11.

Defective regions in which a write error frequently occurs caused by a servo track error such as narrowed servo track or unreadable servo track are detected during the FILL-DATA test. Examples of a write error are listed below.

(1) Even when writing is retried 15 times, the writing cannot be completed without an error.

(2) Although the retrial of writing succeeds before writing is retried 15 times, the number of sectors in which a write error has occurred until the writing retrial succeeded is at least four in three servo sectors. The three servo sectors mean a region between a certain servo sector and another servo sector that is two sectors away from the certain servo sector.

(3) Although the retrial of writing succeeds before writing is retried 15 times, there are many sectors in which a servo data read error occurs.

(4) The seek operation for the track fails.

Figure 3:
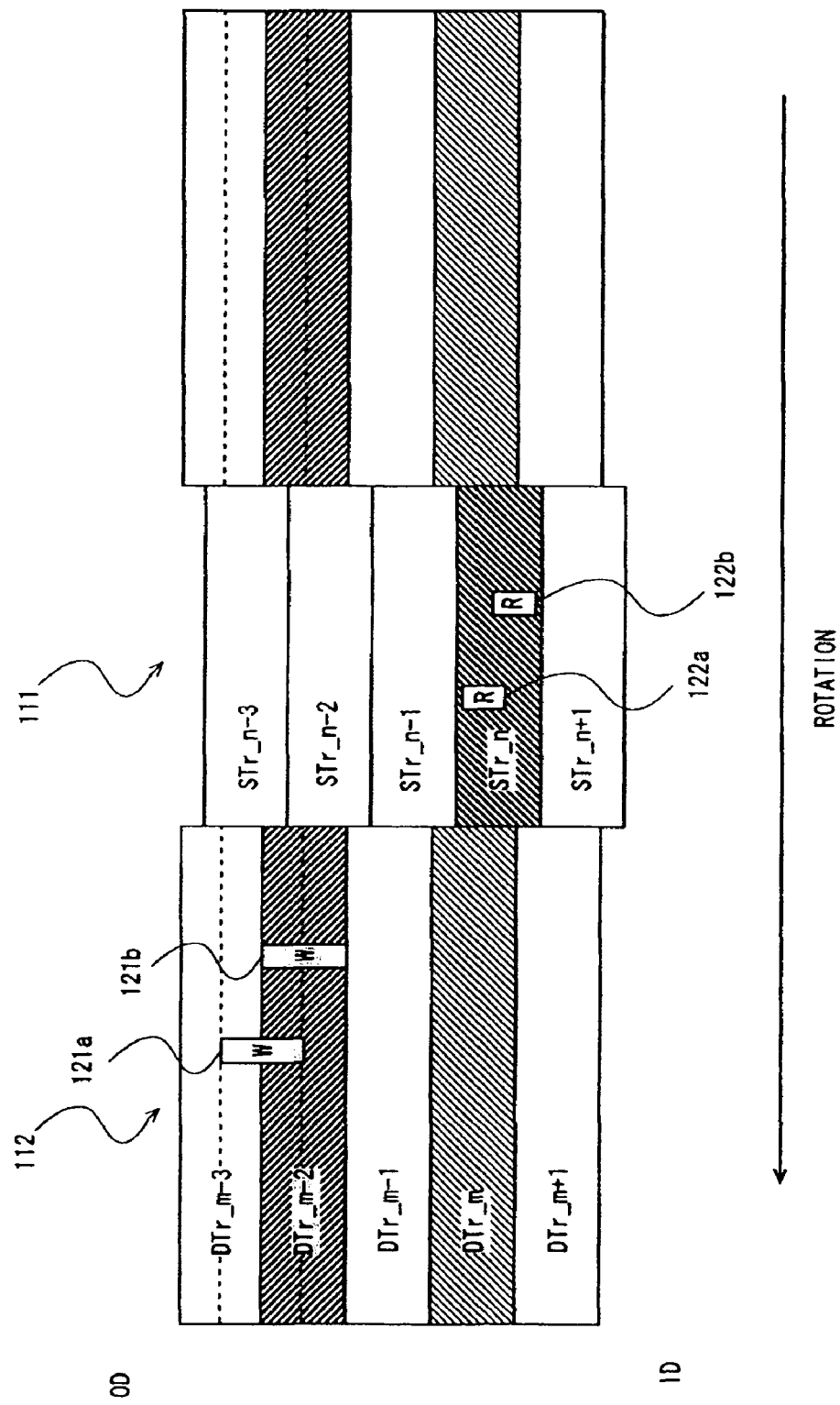
FIG. 3 is a diagram that schematically shows positions of a head during "FILL-DATA at write position" and "FILL-DATA at read position" according to an embodiment of the present invention.

In the FILL-DATA test in accordance with an embodiment of the present invention, "FILL-DATA at write position" and "FILL-DATA at read position" are executed. These tests are described below referring to FIG. 3. In FIG. 3, a write element 121a and a read element 122a are present at a read position, and a write element 121b and a read element 122b are present at a write position.

More specifically, the read element 122b is positioned at a position where the write element 121b writes user data onto a data track DTr_m-2. At this time, the read element 122a is positioned at a position where data is read out from a user track DTr_m. As a result, the write element 121a is present at a position offset from a normal data track in the radial direction of the magnetic disk 11.

The above is explained in further detail using the example of FIG. 3. During "FILL-DATA at write position", the head element section 12 (read element 122) is positioned at a write position for writing data to the normal data track DTr_m-2, and the write element 121 writes data thereto. If a write error occurs on the data track DTr_m-2, this data track DTr_m-2 at which the write element 121 is positioned (writing) is determined as a defective data track, and all data sectors in this track are registered on the PDM. The HDD 1 executes the processing steps for each data track.

During "FILL-DATA at read position", the head element section 12 (read element 122) is positioned at a read position for reading user data from the data track DTr_m, and the write element 121 writes data thereto. If a write error occurs on the data track DTr_m-2, this data track DTr_m-2 at which the read element 121 is positioned is determined as a defective data track, and all data sectors in this track are registered on the PDM. The HDD 1 executes these process steps for each data track.

In the example of FIG. 3, if a write error is detected during "FILL-DATA at read position", a defect is considered to be present on a servo track STr_n from which the read element 122 reads out. For higher reliability of the HDD 1, therefore, in addition to the data track DTr_m from which data is read out using the servo track STr_n, the data track DTr_m-2 to which data is written using the servo track STr_n is preferably registered as a defective region on the PDM.

The above also applies to the data track from which data is read using an error servo track detected during "FILL-DATA at write position". That is, if a write error is detected during "FILL-DATA at write position", a defect is considered to be present on the servo track STr_n from which the read element 122b reads out. For higher reliability of the HDD 1, therefore, in addition to the data track DTr_m-2 to which data is written using the servo track STr_n, the data track DTr_m from which data is read using the servo track STr_n is registered as a defective region on the PDM.

In some embodiments, unlike an error during the read processing, an error during the write processing does not cause overwriting of other data. In certain HDDs, therefore, the data track from which data is read using the error servo track which has been detected during "FILL-DATA at write position" is preferably not registered on the PDM. This makes it possible to save the capacity required for the PDM. In addition, the HDD may be designed so that the data track to which data is written using the error servo track which has been detected during "FILL-DATA at read position" is not registered on the PDM.

Figure 4:
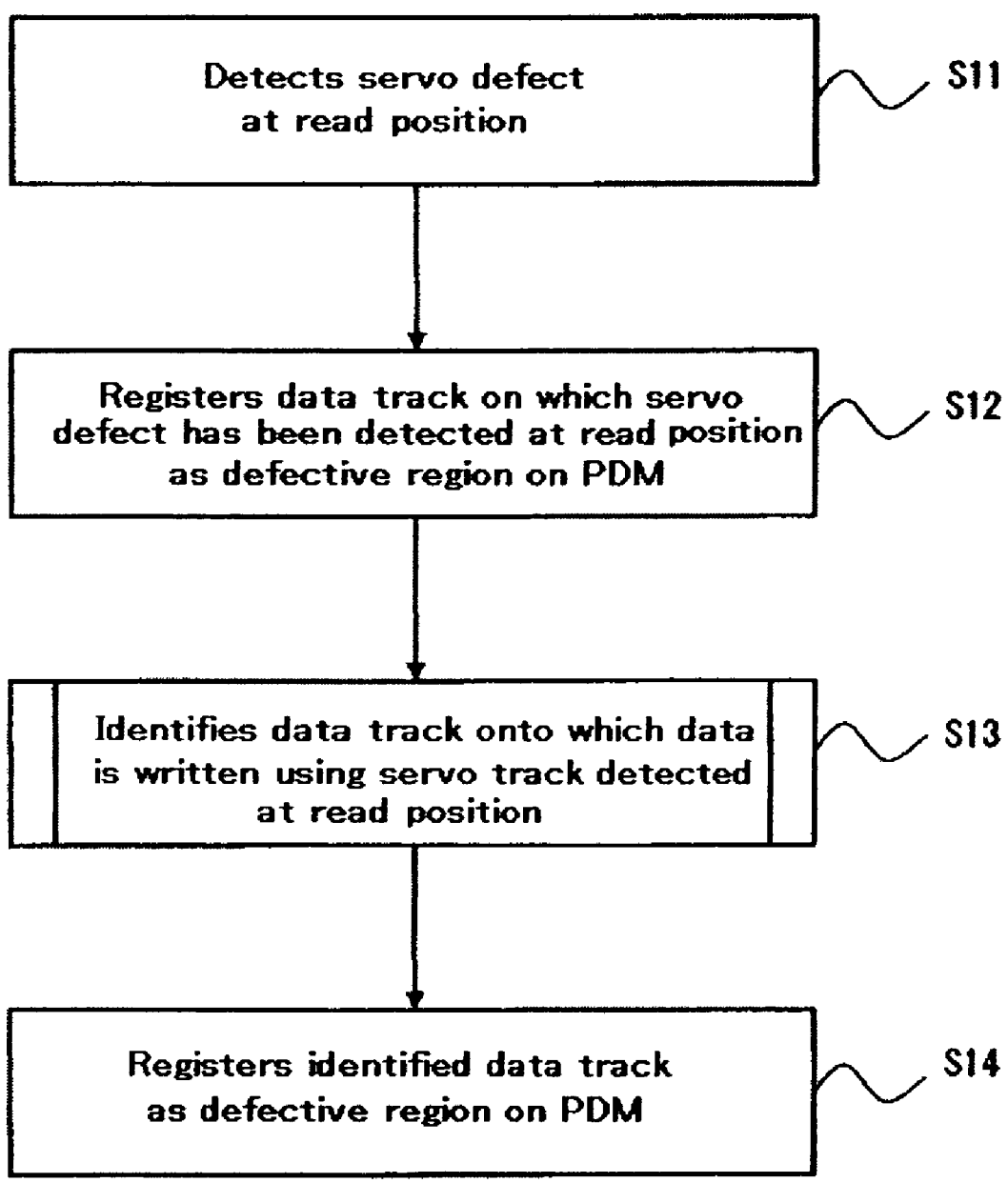
FIG. 4 is a flow chart explaining an example of processing executed if a write error is detected during "FILL-DATA at read position" according to an embodiment of the present invention.

An example of processing in the case where a write error has been detected during "FILL-DATA at read position" is described referring to FIG. 4. The magnetic disk 11 in the present embodiment records data in accordance with an adaptive format in which the data track pitch and the servo track pitch differ from each other. The data track pitch is made greater than the servo track pitch, which prevents a squeeze error and off-track writing, thus improves reliability.

After detecting a write error in step S11 during "FILL-DATA at read position", the HDD 1 executes step S12 to register on the PDM an associated data track from which data is read using the servo track. The HDD 1 further executes step S13 to identify a data track to which data is written using the servo track. The identified data track is registered as a defective region on the PDM in step S14.

In step S13, the HDD 1 needs to identify the data track (DTr_m-2 in FIG. 3) onto which data is written using the servo data which has been detected as an error at the read position. However, normally, the HDD 1 does not have a function to identify the associated data track from the servo track.

Figure 5:
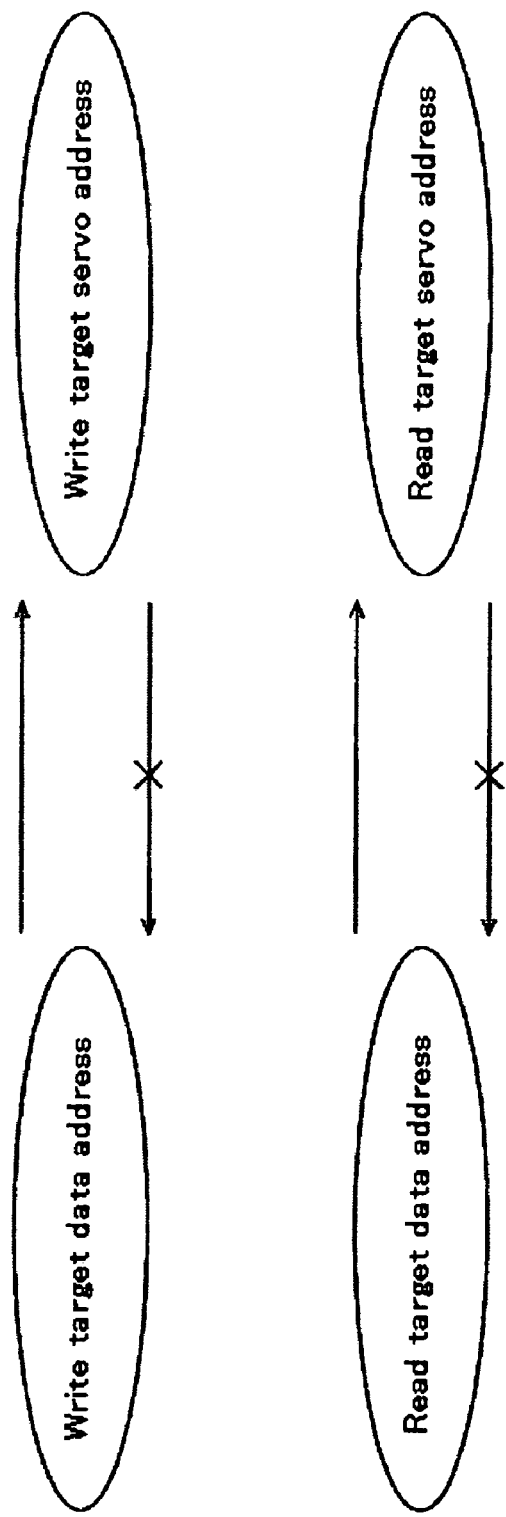
FIG. 5 is a diagram schematically showing an address conversion that the HDD performs under normal operating conditions according to an embodiment of the present invention.

As shown in FIG. 5, after obtaining a target write or read data address from the host 51, the HDD 1 calculates an associated target servo address and positions the read element 122 at this target servo address. If the write element 121 and the read element 122 differ in radial position and a read/write offset exists, a method of calculating the target servo address differs between a read command and a write command.

However, the HDD 1 does not calculate a data address from a servo address during normal read/write processing. In addition, the processing of calculating the data address from the servo address requires complex arithmetic processing. Furthermore, for the adaptive format in which the data track pitch and the servo track pitch differ from each other in the present embodiment, conversion processing between the data address and the servo address be extremely complex. Typically, to calculate a target servo address from a target data address, a cubic or quartic equation is used. The computation of the target servo address from the target data address is therefore considered to be extremely complex.

Accordingly, it is required to identify the data address (data track) by using an arithmetic technique executed during normal processing of the HDD 1. In addition, since SRST is executed using the test program installed in the HDD 1, the program is preferably small in quantity. For this reason, the data address is preferably identified using an arithmetic function installed as a normal function of the HDD 1. For a write error in "FILL-DATA at read position", for example, the read servo address and the read data address at which the error has occurred can be identified. Hence, the HDD 1 uses a normal conversion function to identify a write data track corresponding to the servo track of the particular read servo address.

Figure 6:
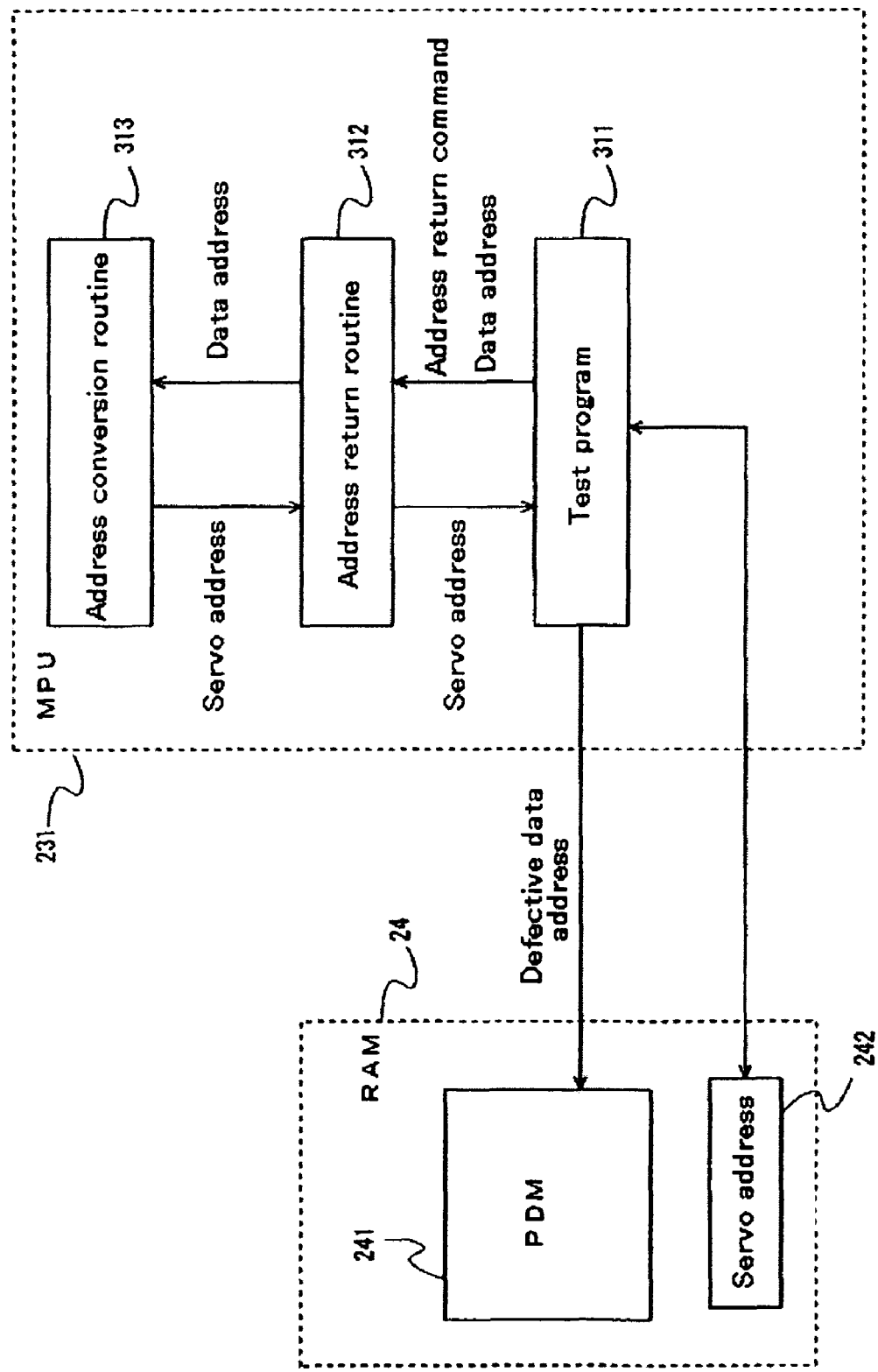
FIG. 6 is a block diagram showing a logical configuration for the processing to identify a read or write data track corresponding to a servo track if an error is detected during FILL-DATA.

FIG. 6 is a block diagram showing a logical configuration for the processing to identify a read or write data track corresponding to the servo track if an error is detected during FILL-DATA. A test program 311 that operates on an MPU 231 controls execution of FILL-DATA. After detecting an error during "FILL-DATA at write position" or "FILL-DATA at read position", the test program 311 uses an address conversion routine 313 to identify the data track corresponding to the servo track on which the error has occurred, and registers the data track as a defective region on PDM 241.

The address conversion routine 313 calculates a servo address corresponding to the target data address that the HDD 1 has obtained from the host 51. Prior to further detailed description of FILL-DATA processing, processing of the address conversion routine 313 during normal operation is described below referring to FIG. 7.

After receiving a read command, write command, or seek command and a target data address from the host 51, a command manager 321 that operates on the MPU 231 calls a seek process routine 322 and passes the target data address. The seek process routine 322 calls the address conversion routine 313 and makes the routine 313 calculate a servo address corresponding to the target data address. The address conversion routine 313 calculates a target servo address in response to the command.

The seek process routine 322 issues a seek instruction together with the target servo address to an HDC 232. In response to this instruction, the HDC 232 controls an R/W channel 21 and receives a current servo address. The seek process routine 322 receives the current servo address from the HDC 232 and outputs control data DACOUT to a motor driver unit 22 in order to move a head element section 12 to a target position. The motor driver unit 22 supplies an electric current to a VCM 25 in accordance with DACOUT and causes an actuator 16 and the head element section 12 to move.

Although the address conversion routine 313 can calculate a servo address from a data address, it cannot execute the reverse calculation. As shown in FIG. 6, the test program 311 estimates a data address corresponding to the servo address at which the error has occurred, and makes the address conversion routine 313 calculate the servo address corresponding to the data address. The test program 311 can identify a data track corresponding to an error servo track by detecting a data address matched with the calculated servo address and the servo track of the error servo address.

Figure 8:
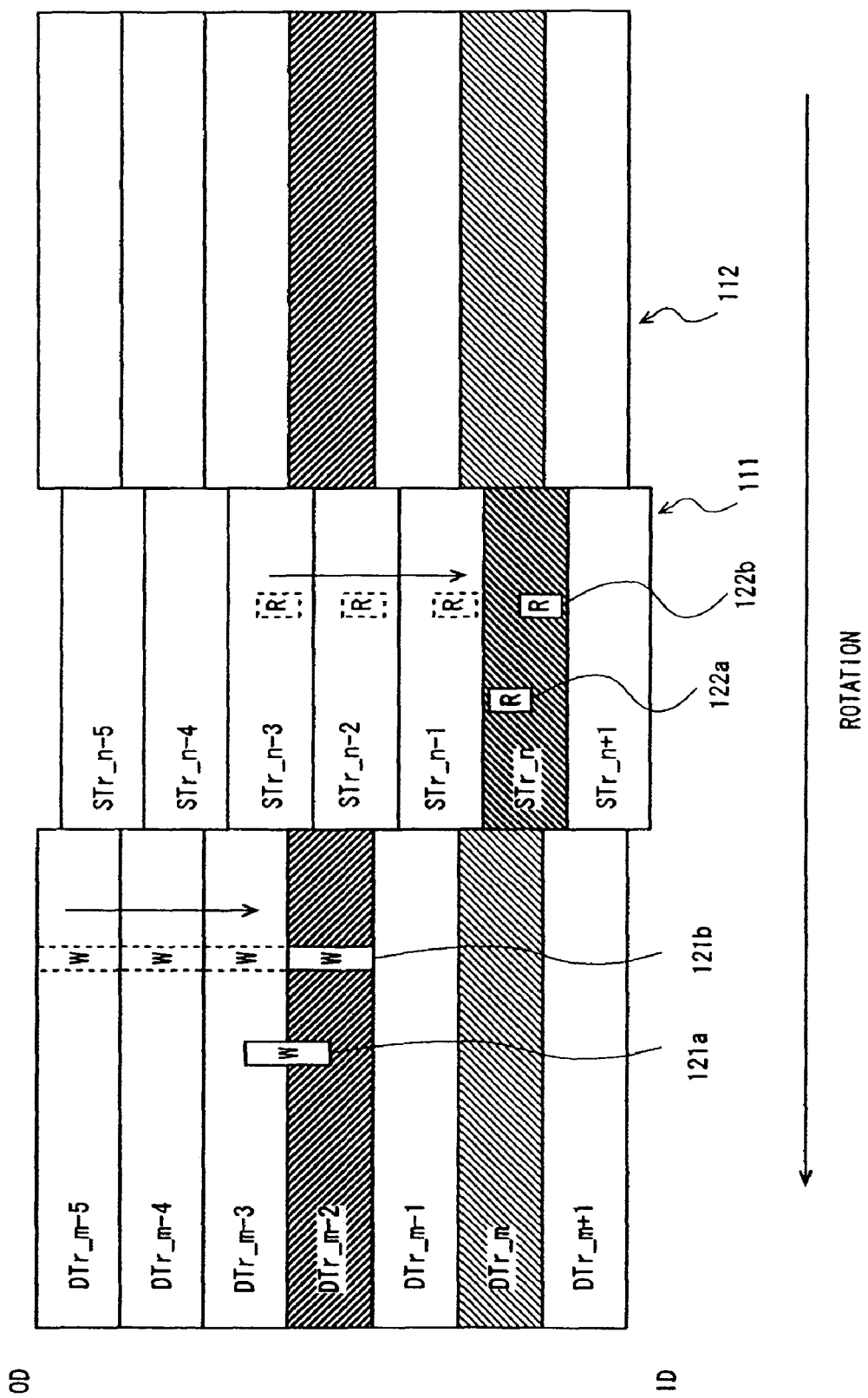
FIG. 8 is a diagram showing an example in which a data track DTr_m-2 onto which data is written using an error servo track STr_n is identified if an error is detected during "FILL-DATA at read position".

A technique for identifying a data track corresponding to an error servo track is described below referring to FIG. 8. FIG. 8 shows an example in which a data track DTr_m-2 onto which data is written using an error servo track STr_n is identified if an error is detected during "FILL-DATA at read position". The test program 311 estimates, from a data track DTr_m on which a write error has occurred during "FILL-DATA at read position", a data track DTr_m-5 as a write data track corresponding to the data track DTr_m, and selects the data track DTr_m-5.

The address conversion routine 313 calculates a servo track STr_n-3 corresponding to the data track DTr_m-5. The test program 311 compares the error servo track STr_n and the servo track STr_n-3, then passes a data address of next estimated data track to the address conversion routine 313 since the two servo tracks differ in track number, and makes the routine 3131 calculate an associated servo address. Subsequently, the same processing is repeated until the servo track of the calculated servo address and the error servo track STr_n match with each other. Thus, a data track corresponding to an error servo track can be identified using the address conversion routine 313 executed during the normal operation of the HDD 1.

What is important here is that the test program 311 can obtain conversion results from the address conversion routine 313 without a seek operation of the head element section 12. As shown in FIG. 6, the test program 311 calls an address return routine 312 by using an address return command, and passes an estimated data address to the routine 312. The address return routine 312 then calls the address conversion routine 313, further passes the estimated data address the address conversion routine 313, and makes the address conversion routine 313 calculate an associated servo address.

Figure 7:
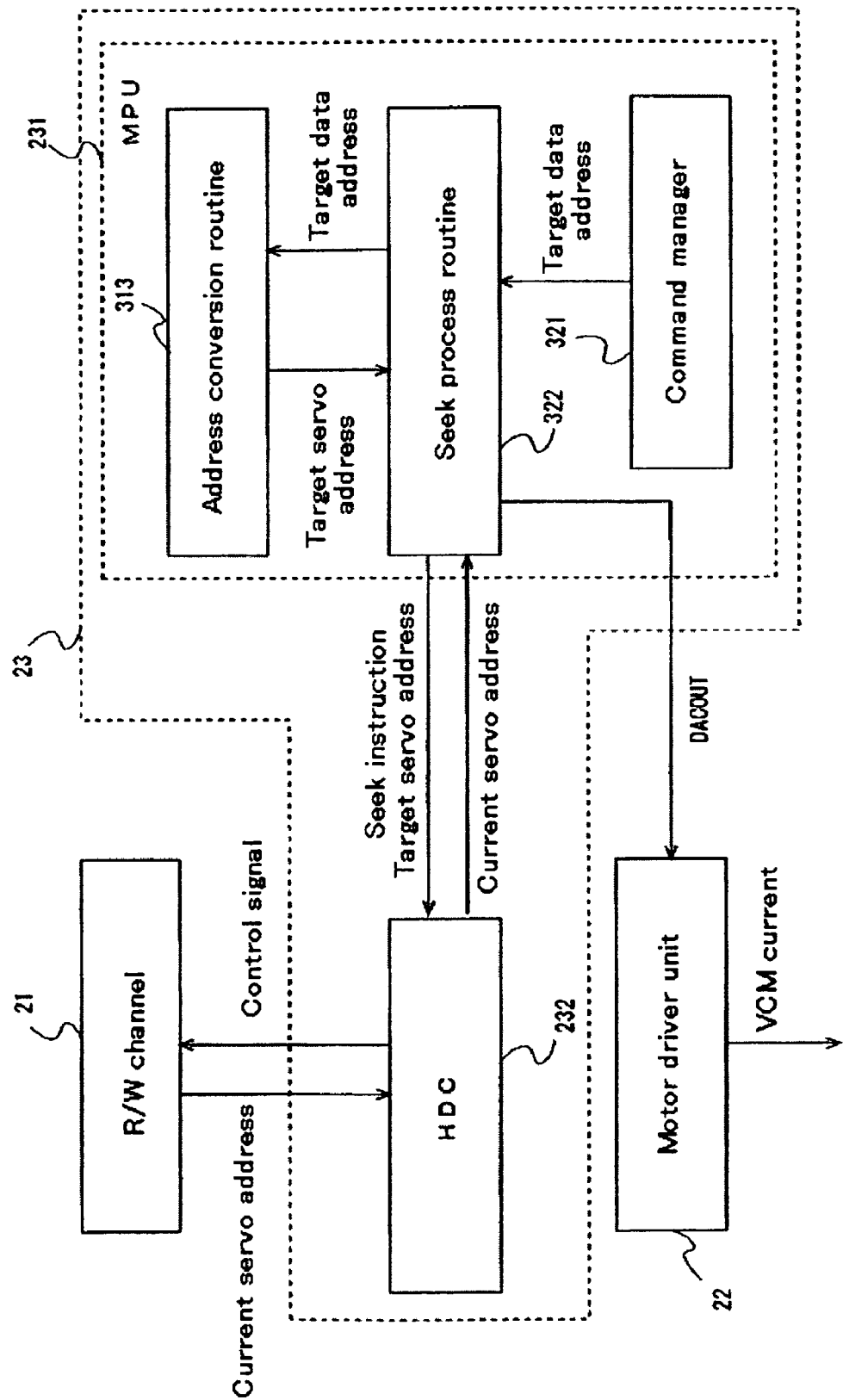
FIG. 7 is a block diagram showing a logical configuration related to address conversion routine processing under normal operating conditions.

The servo address included in the conversion results from the address conversion routine 313 is passed to the test program 311 via the address return routine 312. Such seek operation of the head element section 12 as described referring to FIG. 7 is not performed during the processing using the address return command. Although the address conversion routine 313 is used for the normal seek operation, the seek operation is skipped. This makes it possible to eliminate the time for the seek operation. As a result, the time for the address conversion can be reduced, which eliminates the time for the tests and improves the throughput.

Figure 9:
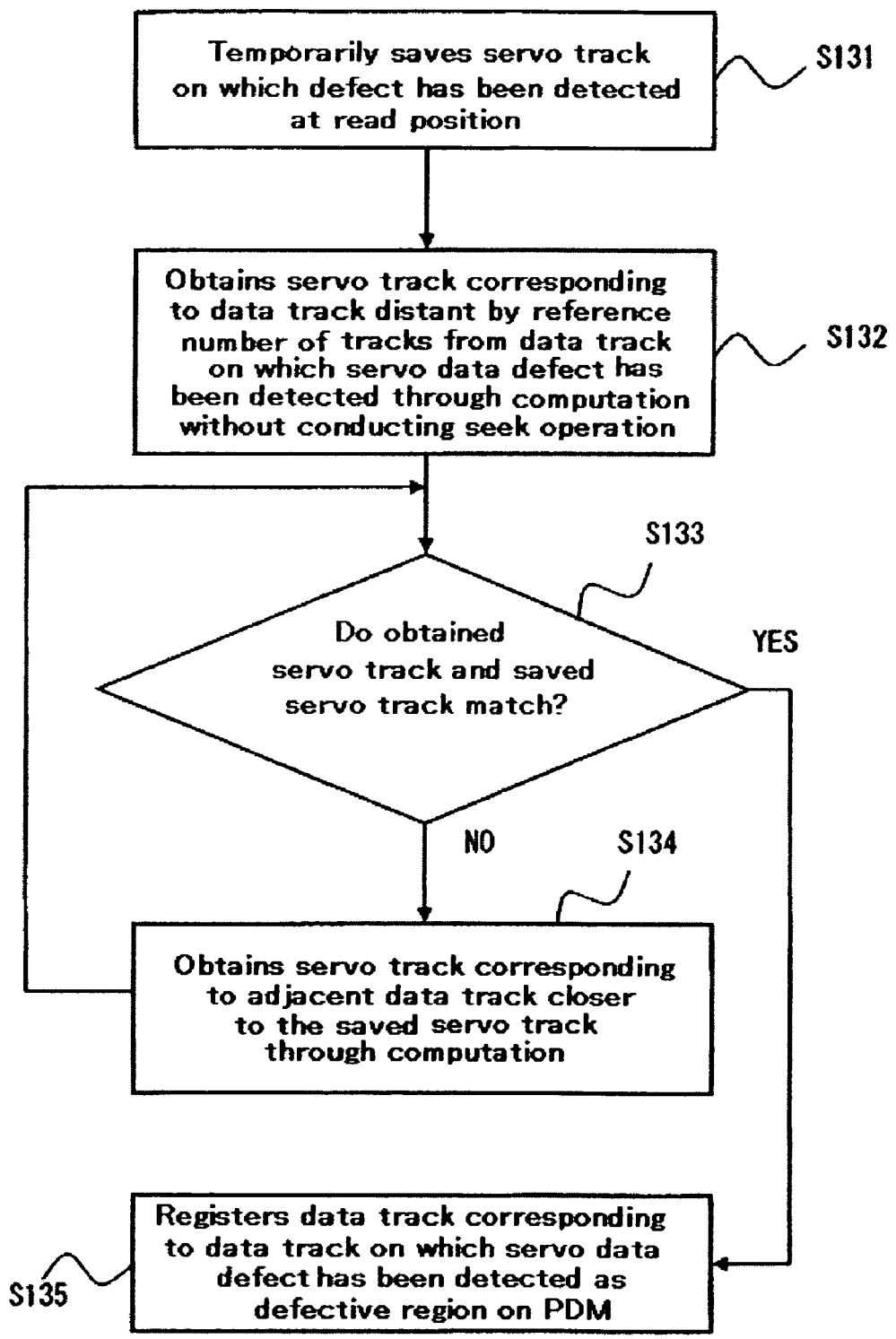
FIG. 9 is a flow chart explaining a process in which a data track onto which logical constituent elements shown in FIG.

As an example, if a write error is detected during "FILL-DATA at read position", a data track onto which each logical constituent element shown in FIG. 6 writes data using an error servo track is identified. This processing will be described referring to FIGS. 6 and 9. Furthermore, the processing is detailed processing in step S13 of FIG. 4.

After detecting the write error during "FILL-DATA at read position", the test program 311 temporarily saves an associated servo address 242 in a RAM 24 in step S131. The test program 311 next selects, as an estimated data track, a data track distant by a reference number of tracks from the data track on which a defect has been detected in the associated servo data. The reference number of tracks may be a fixed value depending on the read/write offset.

The test program 311 passes the address of the estimated data track to the address conversion routine 313 via the address return routine 312. The address return routine 312, after calculating a servo address, passes the servo address to the test program 311 via the address return routine 312. The test program 311 thus obtains the servo address in step S132 without the seek operation.

In step S133, the test program 311 compares the obtained servo address and the saved error servo track 242 and judges whether the servo address and the error servo track match with each other. If both match, the test program 311 registers the estimated data track corresponding to the obtained servo address as a defective region on PDM 241 in step S135.

If both do not match in the above comparison, the test program 311 selects a different data track as an estimated data track. More specifically, the test program 311 selects a data track adjacent to the previously selected data track and closer to the saved error servo track than to the previously selected data track. The test program 311 can determine the direction of a data track to be selected based on a relationship in magnitude between the track number of the servo track and the track number of the error servo track that have not been matched.

The adjacent data track located in the ID direction is selected in this example. In step S134, the test program 311 obtains a servo address corresponding to the newly selected data track through computation by the address conversion routine 313. The data track newly selected is not limited to an adjacent data track. The number of tracks between the current data track and a data track to be next selected can be determined using the above two servo tracks.

As described above, in step S133, the test program 311 compares the obtained servo address and the saved error servo track 242 and judges whether the servo address and the error servo track match. The test program 311 repeats the above processing until the servo track of the obtained servo address matches with the error servo track 242.

The present invention is not limited to the above-described embodiments and various changes may be made without departing from the gist of the invention. For example, while the defect processing method during FILL-DATA has been described above, the present invention may also be applied to other types of defect inspection. With respect to the PDM registration of defective regions in accordance with an embodiment of the present invention, all data sectors in the data tracks are registered. However, part of data sectors corresponding to the defective servo track may be registered. For example, only a data sector corresponding to error servo data may be registered. In addition, although the present invention is particularly suitable for HDDs, it may also be applied to other types of recording disk drives.

What is claimed is:

1. A method of managing defective regions in a recording disk drive that includes a head having a read element and a write element different in position from each other in the radial direction of a recording disk, wherein the recording disk drive positions the head while reading out recorded servo data in a servo region from the recording disk by using the read element, the method comprising: executing data write processing with the read element positioned at a target position for performing either normal data read access or normal data write access; determining that a predefined error occurs during the data write processing because of an error-causing servo data, and then estimating an estimated address of user data in a data region for which other normal data read or normal write access is performed using the error-causing servo data as a target; identifying an address of the servo data used as the target for the other access to the estimated address of the user data; comparing the identified address of the servo data and the address of the error-causing servo data to generate a comparison result indicating a match between the identified address of the servo data and the address of the error-causing servo data; and registering a region identified by the estimated address of the user data as a defective region in accordance with the above comparison result that indicates a match, wherein each of a plurality of data regions is sandwiched between the servo regions extending radially from the center of the recording disk and partitioned at required angle intervals.

2. The method according to claim 1, wherein:
the address of the user data identifies a data track;
the address of the error-causing servo data and the identified address of the servo data identify respective servo tracks; and
all regions in the data track that the address of the user data identifies are registered as defective regions.

3. The method according to claim 1, further comprising:
identifying the address of the servo data from the estimated address of the user data through computation without performing a seek operation of the head.

4. The method according to claim 1, wherein an arithmetic function is used for computation of the servo data address during the normal data read and write access operations.

5. The method according to claim 1, wherein a data track pitch recorded on the recording disk and a servo track pitch recorded thereon differ from each other.

6. The method according to claim 1, further comprising:
repeating the estimation of the user data address and the identification of the servo data address until the identified address of the servo data and the address of the error-causing servo track match with each other; and
registering, as a defective region, the region identified by the user data address for which the match has been obtained.

7. The method according to claim 6, further comprising: determining that the identified address of the servo data and the address of the error-causing servo track do not match, estimating an address of next user data based on the identified address of the servo data such that the servo data used as a target will be close to the error-causing servo data track.

8. A recording disk drive comprising: a head having a read element and a write element different in position from each other in the radial direction of a recording disk, wherein the recording disk includes data regions and servo regions extending radially from the center of the recording disk and partitioned at required angle intervals and each of a plurality of data regions are sandwiched by the servo regions; a memory for storing defective regions of the recording disk; and a controller executing the steps of: determining that a predefined error occurs during data write processing because of an error-causing servo data, while the read element is positioned at a target position for performing either normal data read access or normal data write access, and then estimating an estimated address of user data in one of the data regions to which other normal data read access or normal data write access is performed using the error-causing servo data in one of the servo regions as a target; for the other access to the estimated address of the user data, the controller identifies an address of the servo data used as the target; comparing between the identified address of the servo data and the address of the error-causing servo data to generate a comparison result indicating a match between the identified address of the servo data and the address of the error-causing servo data; storing into the memory a region identified by the estimated address of the user data depending on said comparison result that indicates a match.

9. The recording disk drive according to claim 8, wherein a data track pitch recorded on the recording disk and a servo track pitch recorded thereon differ from each other.

10. The recording disk drive according to claim 8, further identifying the address of the servo data from the estimated address of the user data through computation without performing a seek operation of the head.

11. The recording disk drive according to claim 8, wherein an arithmetic function is used for computation of the servo data address during the normal data read access and normal data write access.

* * * * *